(12) United States Patent
Tertinek et al.

(10) Patent No.: US 12,052,051 B2
(45) Date of Patent: Jul. 30, 2024

(54) ULTRA-WIDEBAND RECEIVER MODULE

(71) Applicant: NXP B.V., Eindhoven (NL)

(72) Inventors: Stefan Tertinek, Graz (AT); Wolfgang Küchler, Graz (AT); Sandeep Mallya, Bangalore (IN); Pradeep Kumar Aithagani, Hyderabad (IN)

(73) Assignee: NXP B.V., Eindhoven (NL)

( * ) Notice: Subject to any disclaimer, the term of this patent is extended or adjusted under 35 U.S.C. 154(b) by 48 days.

(21) Appl. No.: 17/820,343

(22) Filed: Aug. 17, 2022

(65) Prior Publication Data

US 2023/0088441 A1 Mar. 23, 2023

(30) Foreign Application Priority Data

Sep. 22, 2021 (IN) .............................. 202111042958
Dec. 13, 2021 (EP) ..................................... 21214097

(51) Int. Cl.
*H04B 1/7163* (2011.01)
*G01S 7/00* (2006.01)

(52) U.S. Cl.
CPC .......... *H04B 1/71637* (2013.01); *G01S 7/003* (2013.01)

(58) Field of Classification Search
CPC ............................ H04B 1/71637; G01S 7/003
See application file for complete search history.

(56) References Cited

U.S. PATENT DOCUMENTS

| | | |
|---|---|---|
| 2010/0045508 A1 | 2/2010 | Ekbal et al. |
| 2018/0254923 A1 | 9/2018 | Dutz et al. |
| 2020/0292666 A1 | 9/2020 | Maher et al. |
| 2020/0309932 A1* | 10/2020 | Zeng .................... H01Q 1/3241 |
| 2021/0080536 A1 | 3/2021 | Mayer et al. |
| 2021/0124014 A1 | 4/2021 | Mayer et al. |
| 2021/0124016 A1 | 4/2021 | Harris |

FOREIGN PATENT DOCUMENTS

EP 3869223 A1 8/2021

* cited by examiner

*Primary Examiner* — Janice N Tieu (57) ABSTRACT

An ultra-wideband, UWB, receiver module (213) comprising: an antenna for wirelessly receiving UWB signalling from a UWB transmitter module (212) and a processor. The processor is configured to: determine a channel impulse response, CIR, (519) of the wirelessly received UWB signalling, wherein the CIR comprises a plurality of channel taps each having a tap-response-value; identify a predetermined feature (520) in the CIR and an associated channel tap; and based on the channel tap that is associated with the identified feature (520) in the CIR (519), synchronize the UWB receiver module (213) for reception of subsequent UWB signalling.

42 Claims, 8 Drawing Sheets

ULTRA-WIDEBAND RECEIVER MODULE

CROSS-REFERENCE TO RELATED APPLICATIONS

This application claims the priority under 35 U.S.C. § 119 of India application No. 202111042958, filed on 22 Sep. 2021; and also claims the benefit of EP application No. 21214097.4, and having a filed date of Dec. 13, 2021, having common inventors, and having a common assignee, the contents of which are incorporated by reference herein.

FIELD

The present disclosure relates to an ultra-wideband (UWB) receiver module, and in particular one that can perform synchronization based on wirelessly received UWB signalling.

SUMMARY

According to a first aspect of the present disclosure there is provided an ultra-wideband, UWB, receiver module comprising:
  an antenna for wirelessly receiving UWB signalling from a UWB transmitter module; and
  a processor configured to:
    determine a channel impulse response, CIR, of the wirelessly received UWB signalling, wherein the CIR comprises a plurality of channel taps each having a tap-response-value;
    identify a predetermined feature in the CIR and an associated channel tap; and
    based on the channel tap that is associated with the identified feature in the CIR, synchronize the UWB receiver module for reception of subsequent UWB signalling.

Synchronizing the UWB receiver module in this way can advantageously account for any (unpredictable) timing offsets between the UWB transmitter module and the UWB receiver module and can also reduce the processing that is required to identify any reflected versions of the subsequent UWB signalling because the CIR does not need to be calculated for all of the channel taps.

In one or more embodiments, the UWB signalling comprises UWB radar signalling.

In one or more embodiments, the processor is configured to identify a predetermined feature in the CIR that corresponds to reception of the UWB signalling via a direct path from the UWB transmitter module.

In one or more embodiments, the processor is configured to identify one or more of the following predetermined features in the CIR:
  the channel tap of the CIR that has the highest tap-response-value;
  the first channel tap in the CIR that has a tap-response-value that is above a predetermined threshold;
  the result of a mathematical function applied to the tap-response-values satisfying one or more predetermined function-criteria; and
  a predetermined pulse shape defined by the tap-response-values of a plurality of channel taps.

In one or more embodiments, the plurality of channel taps of the CIR together represents a transmission symbol of the UWB transmitter module; and the processor is configured to synchronize the UWB receiver module for reception of subsequent UWB signalling by:
  determining a channel impulse response, CIR, of the received subsequent UWB signalling, wherein:
    the CIR comprises a set of channel taps based on the channel tap that is associated with the identified feature in the CIR, and wherein the set of channel taps is a subset of the plurality of channel taps that together represent the transmission symbol of the UWB transmitter module; and
    each of the set of channel taps has a tap-response-value; and
  processing the tap-response-values of the CIR of the received subsequent UWB signalling to identify any reflected versions of the subsequent UWB signalling.

In one or more embodiments, the UWB signalling comprises an initial UWB radar signalling frame; and the subsequent UWB signalling comprises one or more subsequent UWB radar signalling frames.

In one or more embodiments, the channel tap that is associated with the predetermined feature in the CIR comprises:
  the channel tap that exhibits the identified feature; or
  a channel tap that has a predetermined relationship with the channel tap that exhibits the identified feature.

In one or more embodiments, the UWB signalling comprises UWB ranging signalling and UWB radar signalling, and
  the processor is configured to:
    process the UWB ranging signalling in order to estimate, and compensate for, one or more frequency or timing offsets;
    determine the channel impulse response, CIR, of the UWB radar signalling, wherein the CIR comprises a plurality of channel taps each having a tap-response-value;
    identify a predetermined feature in the CIR and an associated channel tap; and
    based on the channel tap that is associated with the identified feature in the CIR synchronize the UWB receiver module for reception of subsequent UWB radar signalling.

In one or more embodiments, the processor is configured to:
  synchronize the UWB receiver module for reception of subsequent UWB radar signalling based on the channel tap that is associated with the identified feature in the CIR, and the estimated frequency or timing offsets.

In one or more embodiments, the processor is configured to process the UWB ranging signalling in order to estimate, and compensate for, carrier frequency offset.

In one or more embodiments, the processor is configured to process the UWB ranging signalling in order to estimate, and compensate for, one or both of:
  a timing offset; and
  a local oscillator phase offset.

There is also provided a multi-device radar system comprising:
  any UWB receiver module disclosed herein; and
  a UWB transmitter module that is configured to wirelessly transmit UWB signalling to the UWB receiver module.

In one or more embodiments, the UWB receiver module and the UWB transmitter module have a shared or a common clock.

According to a further aspect of the present disclosure, there is provided a method of synchronizing an ultra-wideband, UWB, receiver module, the method comprising:
  wirelessly receiving UWB signalling from a UWB transmitter module; and determining a channel impulse response, CIR, of the wirelessly received UWB signalling, wherein the CIR comprises a plurality of channel taps each having a tap-response-value;

identifying a predetermined feature in the CIR and an associated channel tap; and based on the channel tap that is associated with the identified feature in the CIR, synchronize the UWB receiver module for reception of subsequent UWB signalling.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

In a multi-device radar system, multiple radar devices are collocated to receive range and velocity information from objects in the environment at different viewing angles. A common problem is to synchronize the multiple devices such that the transmitters (TX) and receivers (RX) of each device are synchronized with the TX and RX of every other device of the radar system, which is needed whenever the radar devices cooperate with one another (multiple-input multiple-output (MIMO, multi-static etc.)). A key aspect of synchronization is whether the devices have a shared clock or independent clocks.

Figure 1A:
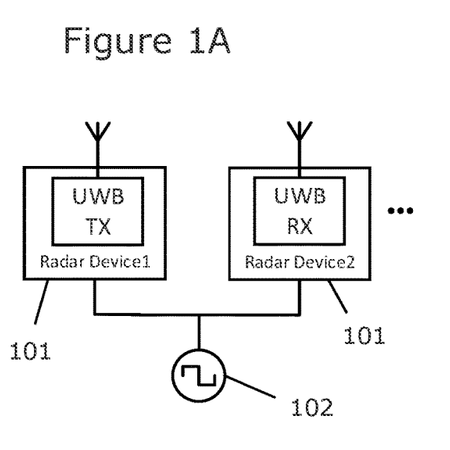
FIG. 1A shows a multi-device radar system, where the two radar devices that are shown have a shared clock.
Figure 1B:
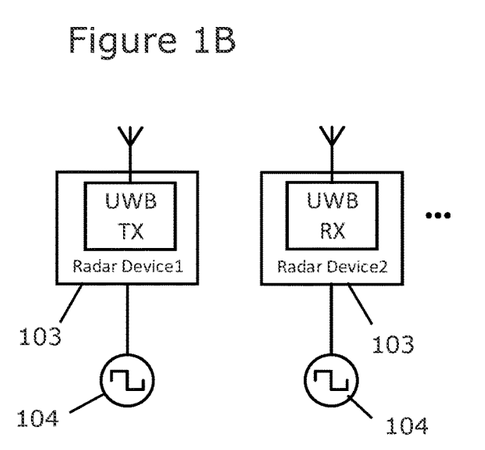
FIG. 1B shows a multi-device radar system, where the two radar devices that are shown each have their own independent clock.

FIG. 1A shows a multi-device radar system, where the two radar devices 101 that are shown have a shared clock 102. FIG. 1B shows a multi-device radar system, where the two radar devices 103 that are shown each have their own independent clock 104.

In a radar system based on ultra-wideband (UWB) the TX transmits a series of pulses within a frame, and an RX receives the radar reflections and determines a channel impulse response (CIR) that contains the target movement as changes of amplitude and phase in the CIR taps (or range tap, which are equivalent to distance). The goal of synchronization is to align the CIRs of the multiple RX such the target responses from the viewing angles are correctly combined. Two ways of performing synchronization are wired synchronization and wireless synchronization.

Wired synchronization has several drawbacks:

A UWB device may contain no dedicated hardware (HW), such that there is no SYNC signal and no internal SYNC stage.

Connecting multiple devices via a dedicated SYNC line can be expensive. E.g. in a vehicle it can be difficult to route a signal from device to device over a long distance, and if there is weak signal strength the additional buffers are required which adds to complexity and cost.

In addition, synchronizing the local oscillator (LO) signals of TX and RX phase-locked loops (PLLs) has additional disadvantages:

coaxial cable is needed which is expensive, in terms of the cable itself and also associated connectors.

there can be complications in production line. For instance a minimal bending radius needs to be obeyed, precise matching is required etc.

maintenance can be complicated. For example, it can be difficult to replace if soldered.

high power consumption due to high LO frequency (which can be several GHz).

Examples disclosed herein relate to methods and systems for wirelessly synchronizing multiple UWB radar devices, irrespective of whether they share a clock or have independent clocks. UWB signalling can relate to signalling that has a frequency in the range of 6 GHz to 9 GHz.

Figure 2:
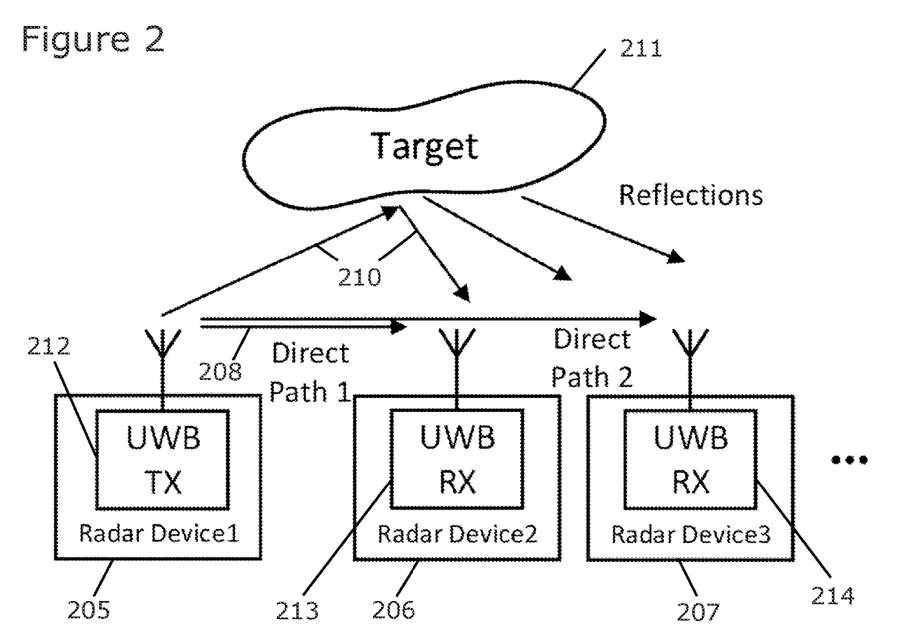
FIG. 2 shows an example embodiment of a radar system.

FIG. 2 shows an example embodiment of a radar system. The radar system includes a first radar device 205 that includes a UWB transmitter module 212, and a second and a third radar device 206, 207 that each include a UWB receiver module 213, 214. These modules can be considered as processors or can include processors.

The UWB transmitter module 212 has an antenna that transmits UWB signalling. Each of the UWB receiver modules 213, 214 has an antenna that receives the UWB signalling from the UWB transmitter module 212. As shown schematically in FIG. 2, the UWB signalling can follow a direct path 208 between the antenna of the UWB transmitter module 212 of the antenna of the first radar device and the UWB receiver module 213 of the second radar device 206. There can also be several reflective paths between the antenna of the UWB transmitter module 212 of the first radar device and the antenna of the UWB receiver module 213 of the second radar device 206, via a target 211. One such reflected path is shown in FIG. 2 with reference 210. The direct path 208 will typically be the shortest path between the TX and RX antennas. Also, the direct path 208 is typically also the strongest (in that the UWB signalling that is received at the antenna of the UWB receiver module 213 of the second radar device 206). As will be discussed in detail below, examples disclosed herein use the direct path for wireless synchronization of the CIRs of the different RXs.

Even if the UWB transmitter module 212 and the UWB receiver module 213 are started simultaneously (e.g., via an external trigger), and even if they share a clock (as shown in FIG. 1A), synchronization is still needed because device imperfections will cause a random shift of the start of each UWB receiver module 213 with respect to the UWB transmitter module 212. This can lead to a misalignment of the CIRs. The imperfections may be due to one or more of:

Clock domain crossing (e.g., faster to slower clock);
Firmware (FW) uncertainties and delays (e.g., due to scheduling, interrupts, polling etc.); and
impact of jitter on trigger signals.

A hardware-based synchronization mechanism can address at least some of these issues. However, not all radar devices support such a sync mechanism, as discussed above, and there are various disadvantages associated with using wired synchronization.

Figure 3:
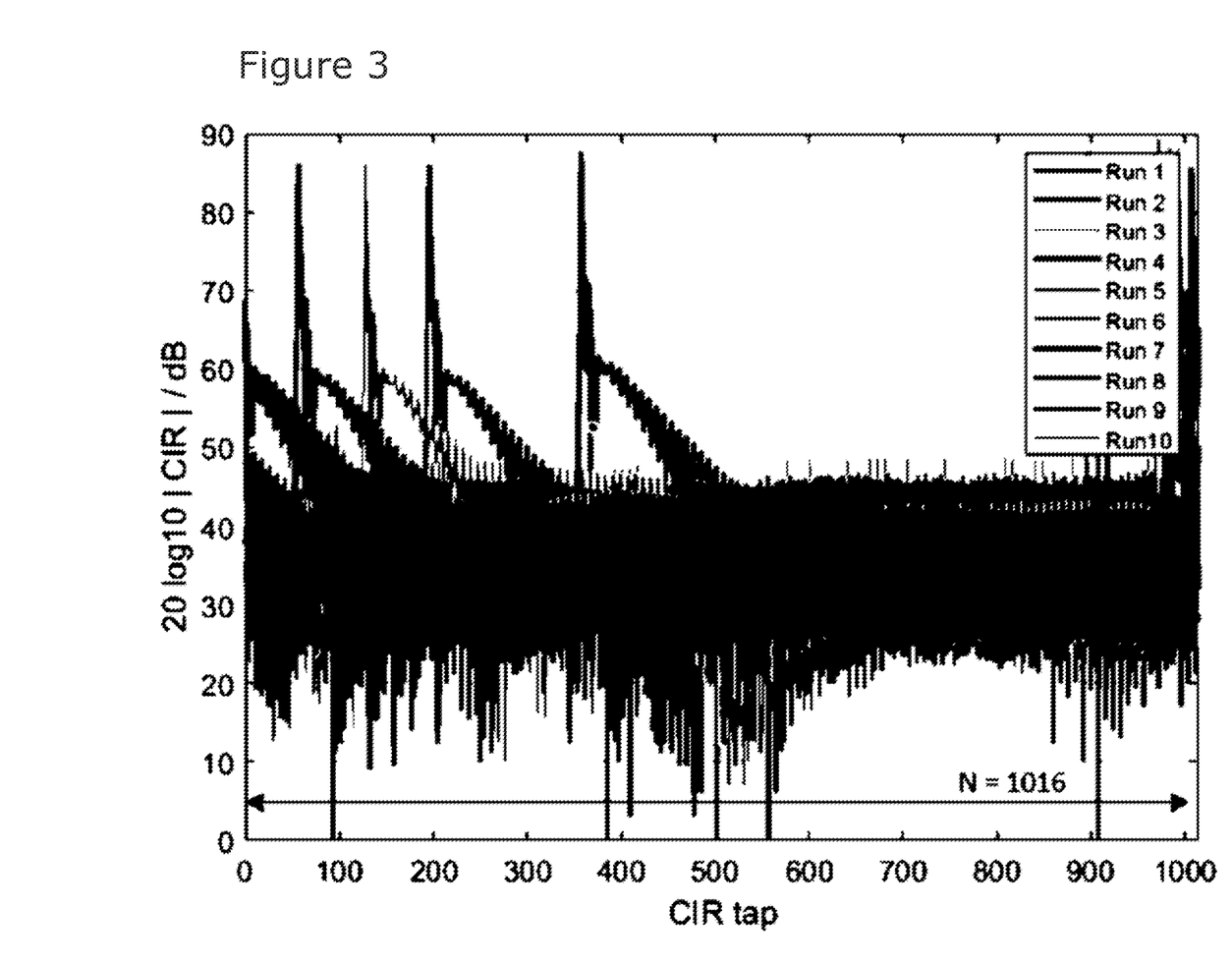
FIG. 3 shows a plot of 10 channel impulse responses (CIRs) that are calculated by a UWB receiver module, with each CIR overlaid upon each other.

FIG. 3 shows a plot of 10 channel impulse responses (CIRs) that are calculated by a UWB receiver module, with each CIR overlaid upon each other.

FIG. 3 shows the results for an implementation of a UWB radar system that comprises:

One TX;
Multiple RXs;
A shared reference clock (i.e. a 55.2 MHz XTAL from a master device shared with clock devices);
Start of radar operation via an external trigger signal; and
Synchronization firmware implemented on a digital signal processor (DSP).

Each CIR in FIG. 3 represents the results of a different run. The UWB receiver module is restarted for each run. Each peak that is visible in the plot of FIG. 3 represents the reception of UWB signalling from a UWB transmitter module over a direct path. (It is recalled that the UWB signalling received via the direct path is expected to have the highest power.) Since the peak of each run that is shown in FIG. 3 occurs at a different time (as represented by the channel taps on the horizontal axis), FIG. 3 shows how the imperfections that identified above result in the RX start not being synchronized with the TX start.

Figure 4:
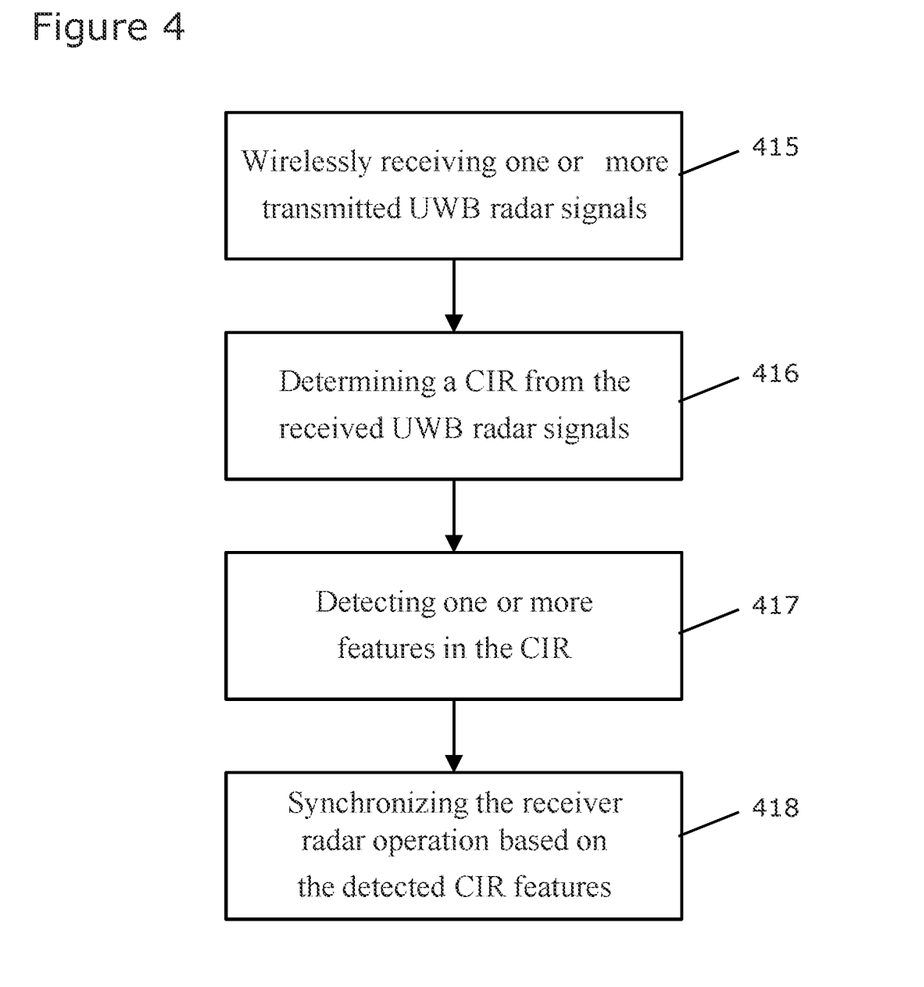
FIG. 4 shows an example embodiment of a method for performing wireless synchronization for a multi-device UWB radar system that uses a shared clock.

FIG. 4 shows an example embodiment of a method for performing wireless synchronization for a multi-device UWB radar system that uses a shared clock (like the system in FIG. 1A).

In a relatively simple case, the radar system has a reference clock (e.g., 55.2 MHz) that is shared among all devices. In general, this clock is driving the phase locked loops (PLLs) that generate digital clocks (e.g., for RX digital baseband) and radio frequency (RF) clocks/signals (e.g., LO signal, digital-to-analog converter clock, etc.). With the clock being shared, any drift and carrier frequency offsets between the PLLs on the TX and the RXs are eliminated.

At step 415, the method involves a UWB receiver module wirelessly receiving UWB signalling from a UWB transmitter module. As discussed with reference to FIG. 2, such UWB signalling can be received via a direct path and/or a reflected path.

At step 416, a processor associated with the UWB receiver module determines a channel impulse response, CIR, of the wirelessly received UWB signalling.

Figure 5:
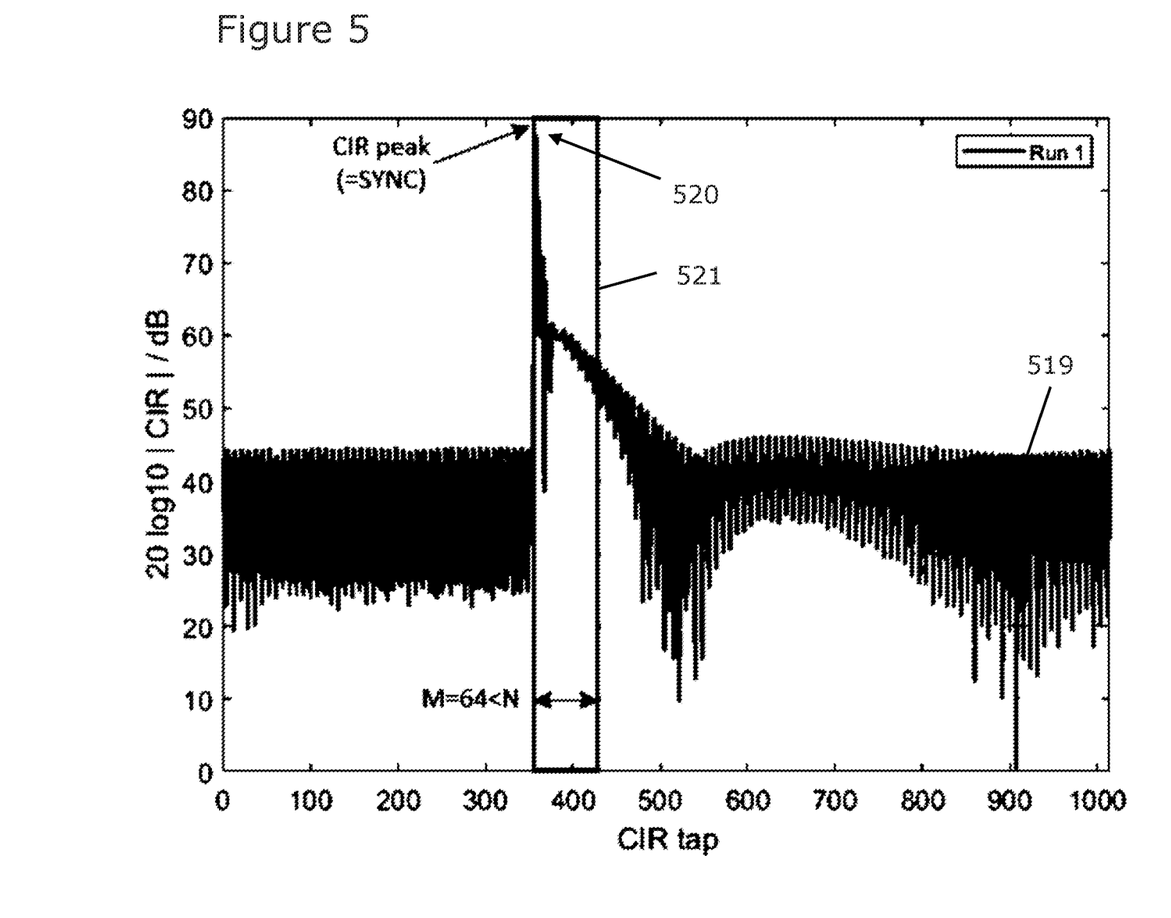
FIG. 5 shows an example of a single CIR.

FIG. 5 shows an example of a single CIR 519 (as opposed to the 10 CIRs that are shown overlaid with each other in FIG. 3). The CIR 519 has a plurality of channel taps (represented by the horizontal axis) each having a tap-response-value (represented by the vertical axis). The CIR 519 has a peak 520 that corresponds to reception of UWB signalling via the direct path.

Figure 9:
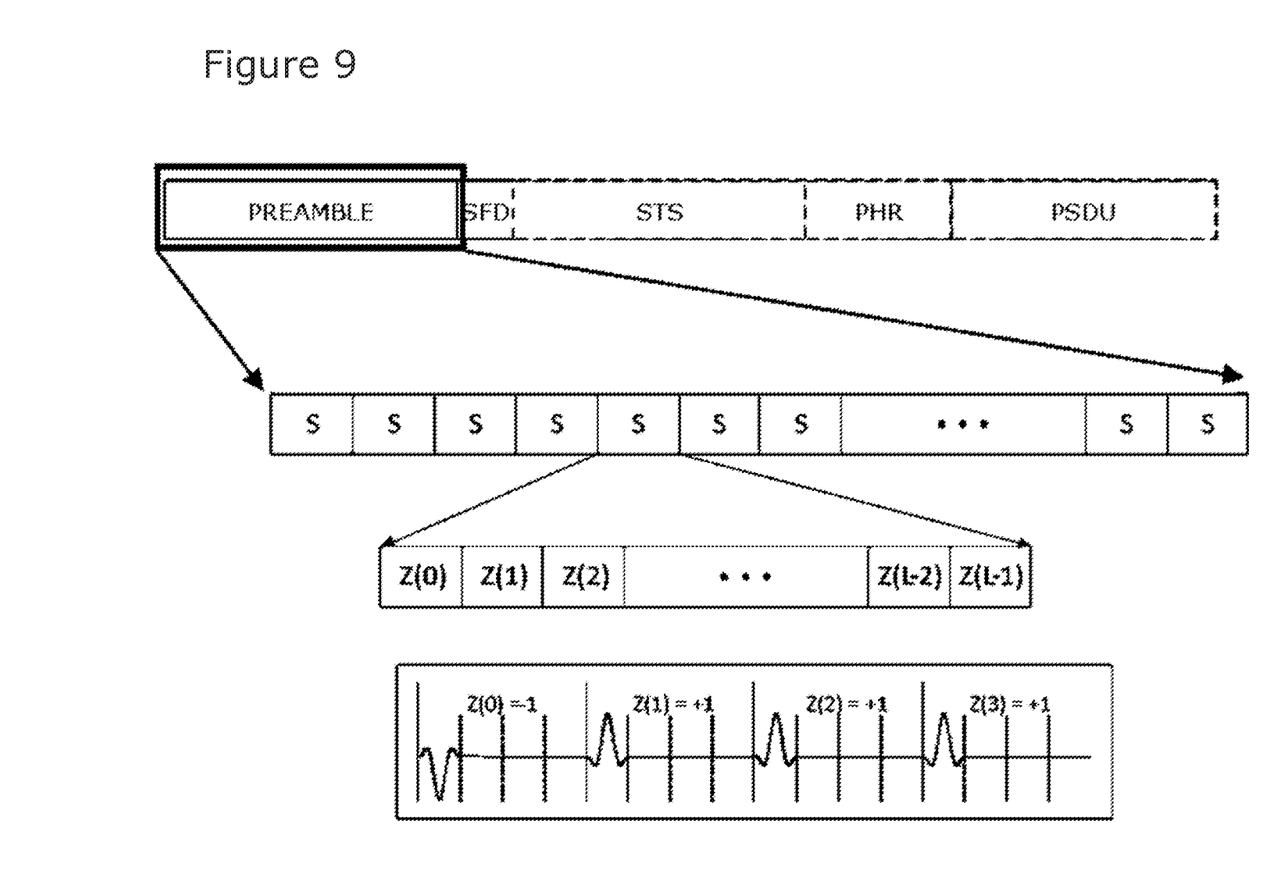
FIG. 9 shows the UWB frame format according to IEEE 802.15.4.

The generation of such CIRs is well known in the art. At a high level, it can relate to one frame that contains a symbol "S" that is repeated N times. This is shown in FIG. 9 and will be described in more detail below. In the receiver, all N symbols are averaged, yielding one "average symbol". This symbol, which comprises a transmitted code, is correlated against the transmitted code known to the receiver, thereby producing the CIR.

Returning to FIG. 4, at step 417 the method identifies one or more features in the CIR and also identifies an associated channel tap. As will be discussed below, such features can be one or more predetermined features in the CIR that correspond to reception of the UWB signalling via a direct path from the UWB transmitter module.

Examples of features that can be identified include:
the channel tap of the CIR that has the highest tap-response-value, which therefore corresponds to a strongest path between the UWB transmitter module and the UWB received module. As indicated above, this can be expected to correspond to reception of UWB signalling via the direct path.
the first channel tap in the CIR that has a tap-response-value that is above a predetermined threshold. This represents another feature that can identify the CIR tap that corresponds to the first arrival of the UWB signalling.
the result of a mathematical function applied to the tap-response-values satisfying one or more predetermined function-criteria. In this way, when a mathematical function is applied to the CIR, the result of the function can be checked against one or more criteria that are expected to identify reception of the UWB signalling via the direct path—for example to select the one with the highest or lowest value, or the first one that exceeds (or drops below) a threshold, depending upon the function that is applied. A non-limiting example of a function that can be applied is a squared function.
a predetermined pulse shape defined by the tap-response-values of a plurality of (optionally contiguous) channel taps. In this way, the UWB transmitter module can set the shape of a plurality of channel taps according to a predetermined pattern, and the UWB receiver module identify the pattern in the received UWB signalling in order to successfully match to the associated UWB transmitter module.

At step 417, once the one or more features in the CIR have been identified, an associated channel tap can then be determined. For instance, the associated channel tap may the one that exhibits the identified feature (e.g., the one with the highest tap-response-value). Alternatively, the associated channel tap may be the one that has a predetermined relationship with the channel tap that exhibits the identified feature (e.g., the channel tap that is 5 channel taps after the one with the highest tap-response-value). Such an alternative arrangement can still enable the method of FIG. 4 to achieve its advantages, as will be appreciated from the discussion that follows.

Then, at step 418, based on the channel tap that is associated with the identified feature in the CIR, the method synchronizes the UWB receiver module for reception of subsequent UWB signalling. Such synchronization can be performed in one of a number of different ways once the channel tap that is associated with the identified feature in the CIR is known. Assuming that each of a plurality of UWB receiver modules use the same synchronization method, then it does not matter what that method is.

Returning to FIG. 5, each of the 1016 channel taps of the CIR that are shown represent a transmission period symbol of the UWB transmitter module. In this example, each of these 1016 channel taps (i.e., the entire CIR) is processed in order to identify the predetermined feature in the CIR and the associated channel tap. In FIG. 5, the feature is the channel tap of the CIR 519 that has the highest (peak) tap-response-value 520—which is tap number 350.

The method in this example then synchronizes the UWB receiver module for reception of subsequent UWB signalling by determining a channel impulse response, CIR, of the received subsequent UWB signalling. However, the CIR for the subsequent UWB signalling comprises a set of channel taps based on the channel tap that is associated with the identified feature in the CIR, and the set of channel taps is a subset of the channel taps that together represent the transmission period symbol of the UWB transmitter module. That is, the CIR of the subsequent UWB signalling is not calculated for all of the channel taps (represented by the horizontal axis)—instead it is calculated for a subset of the channel taps (as represented by the box that is shown in FIG. 5 with reference 521). Furthermore, the channel taps that are included in the subset are based on the channel tap that is associated with the identified feature in the CIR for the earlier UWB signalling. In the example of FIG. 5, the subset of channel taps is the 64 taps that immediately follow the highest (peak) tap-response-value 520.

Then, the method can process the tap-response-values of the CIR of the received subsequent UWB signalling (which is only a subset of the full range of channel taps) to identify any reflected versions of the subsequent UWB signalling.

In this way the CIR can be computed for all N=1016 taps of a first instance of the UWB signalling (for example the first UWB signalling that is received after start-up), and the CIR peak is determined. As the CIR peak corresponds to the direct path, any reflection from the actual target would come after the peak. Thus, detecting the CIR peak implies synchronization between TX and RX because the identification of any reflected versions of subsequent instances of the UWB signalling can be restricted to a subset of the channel taps that are expected to include it.

Figure 6A:
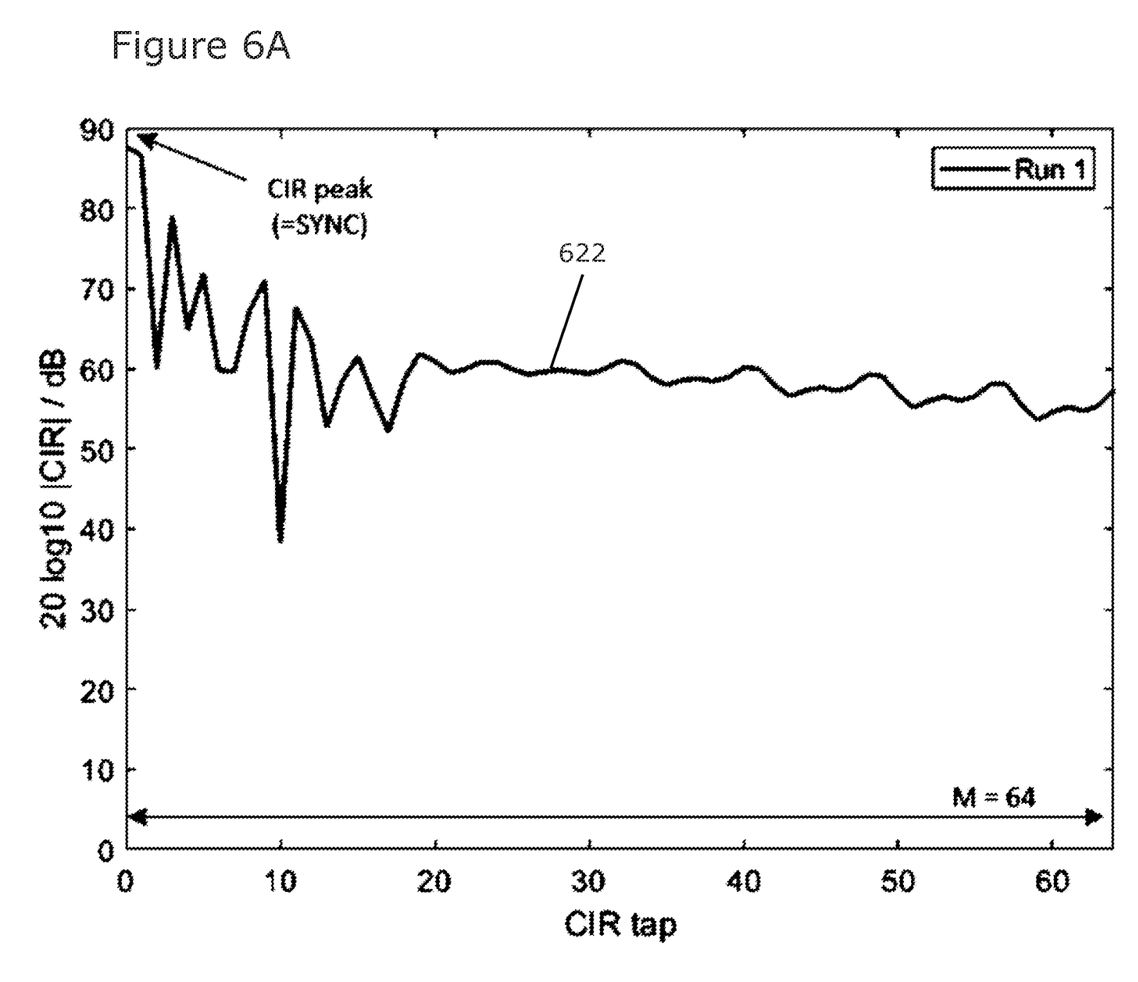
FIG. 6A shows a first example of a CIR that is calculated for subsequent UWB signalling.
Figure 6B:
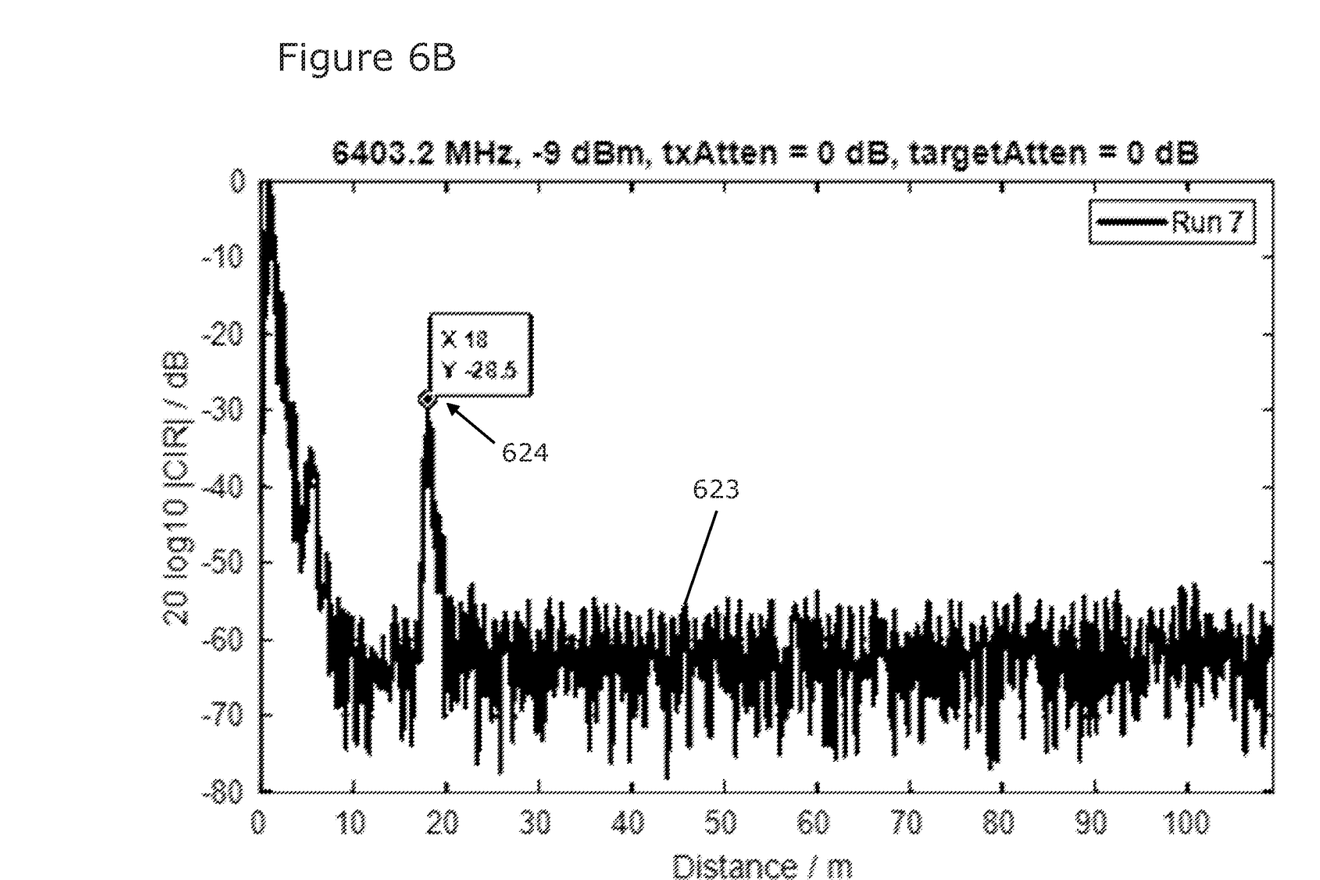
FIG. 6B shows a second example of a CIR that is calculated for subsequent UWB signalling.

FIG. 6A shows a first example of a CIR that is calculated for subsequent UWB signalling, in this example for 64 of the total 1016 channel taps. FIG. 6B shows a second example of a CIR that is calculated for subsequent UWB signalling, in this example for 110 of the total 1016 channel taps.

Methods of identifying reflected versions of UWB signalling are well-known in the art and will not be described in detail here. Nonetheless, FIG. 6A is an example of a CIR 622 where a reflected version is not identified. FIG. 6B is an example of a CIR 623 where a reflected version is identified, as represented by the peak 624 at a distance of 18 m. as is known in the art, the index of the channel tap at which the reflected UWB signalling is identified corresponds to the distance to the target that reflects the UWB signalling. For instance, in one example each channel tap can represent 0.15 metres. Therefore, it will be appreciated that the number of channel taps that included in the CIR of the subsequent UWB signalling will define the maximum range of the radar system.

Synchronizing the UWB receiver module in this way can advantageously account for any timing offsets between the UWB transmitter module and the UWB receiver module (that are unpredictable, as described with reference to FIG. 3), and can also reduce the processing that is required to identify any reflected versions of the subsequent UWB signalling because the CIR does not need to be calculated for all of the channel taps. In some applications, this can limit the amount of data that is streamed to a host for identifying reflected versions of the subsequent UWB signalling.

Figure 7:
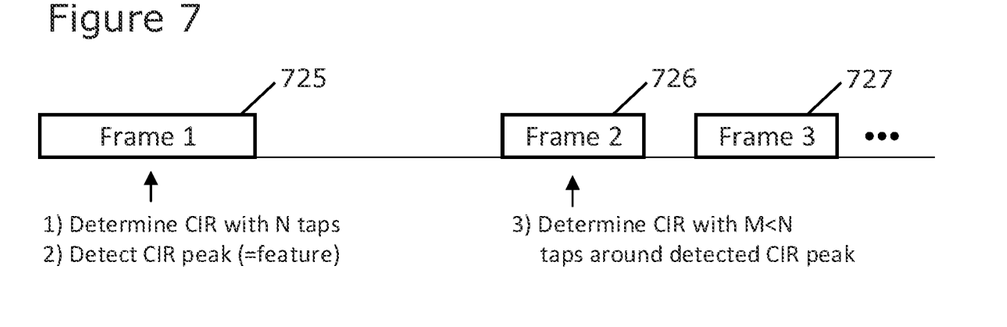
FIG. 7 shows a graphical representation of how (initial) UWB signalling and then subsequent UWB signalling is processed according to the method of FIG. 4.

FIG. 7 shows a graphical representation of how (initial) UWB signalling and then subsequent UWB signalling is processed according to the method of FIG. 4.

UWB radar frame 1 725 in FIG. 7 is an example of (initial) UWB signalling. Frame 1 725 is processed to determine a CIR with N taps, which can represent a complete transmission symbol. In FIG. 5, N=1016. The CIR with N taps is then processed to detect a CIR peak (as an example of a feature), in this example the strongest peak.

UWB radar frames 2 and 3 726, 727 are then received after frame 1 725. UWB radar frames 2 and 3 726, 727 are examples of subsequent UWB signalling. UWB radar frames 2 and 3 726, 727 are then processed to determine a CIR with M taps around the peak that was identified in the CIR for frame 1 725, where M is less than N. In this way, the CIRs for frames 2 and 3 726, 727 include taps that are a subset of the CIR for frame 1 725. Extracting the M taps in this way represents the synchronization.

Figure 8:
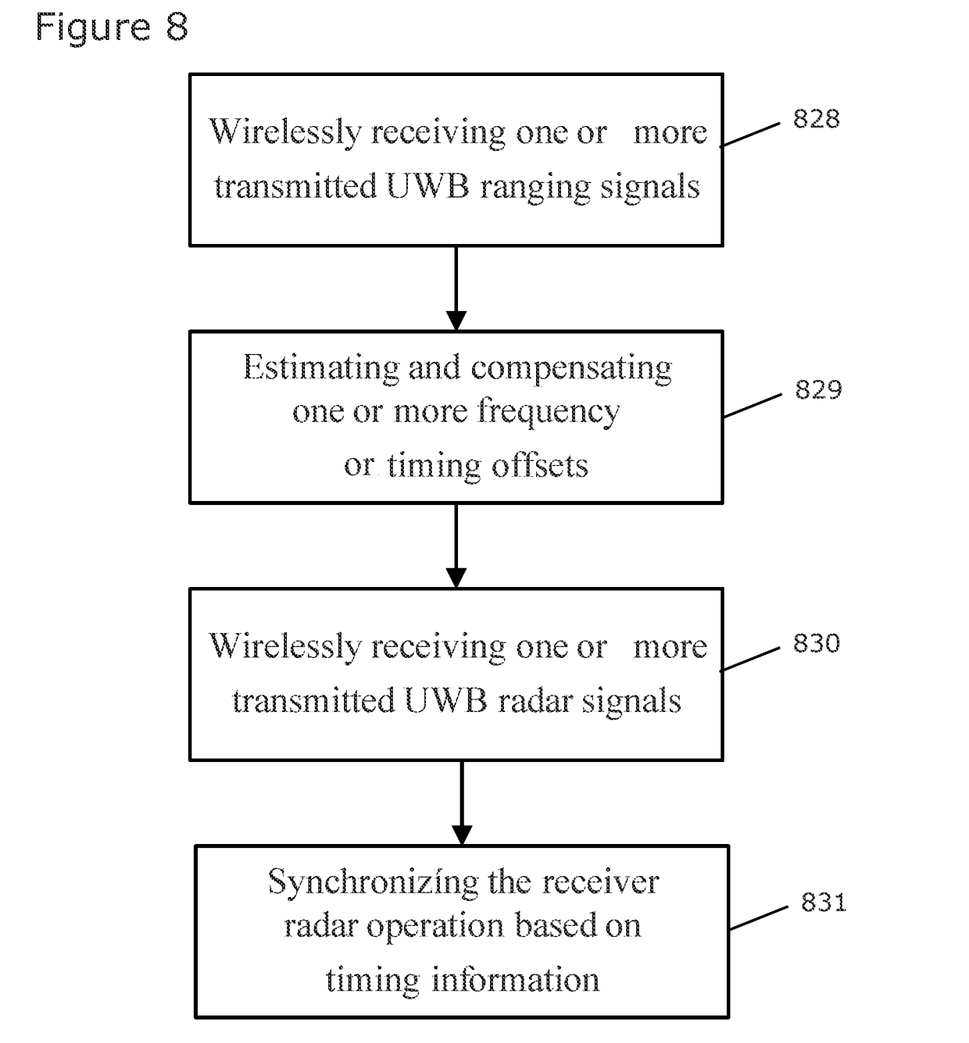
FIG. 8 shows an example embodiment of a method for performing wireless synchronization for a multi-device UWB radar system where the radar devices use independent clocks.

FIG. 8 shows an example embodiment of a method for performing wireless synchronization for a multi-device UWB radar system where the radar devices use independent clocks (like the system in FIG. 1B).

As the independent clocks will not be exactly the same, there will be a drift as well as a timing and frequency offset between the PLLs on the TX and the RXs. This can include:
  carrier frequency offset (CFO);
  sampling offset;
  timing offset;
  phase offset;
  etc.

Drift and offsets should be compensated before RX radar operation can start. For example, the CFO may be compensated by retuning the RF PLL.

In the example of FIG. 8, an initial synchronization operation is performed based on UWB ranging signalling before the synchronization that is shown in FIG. 4 is performed.

At step 828, the method receives UWB ranging signalling from the UWB transmitter module.

FIG. 9 shows the UWB frame format according to IEEE 802.15.4 (which is a relevant UWB standard).

The general ranging format for secure ranging, as shown in FIG. 9 includes:
  i. PREAMBLE
  ii. SFD=Start-of-frame delimiter
  iii. STS=Secure training sequence (optional)
  iv. PHR=PHY header (optional)
  v. PSDU=PHY service data unit (optional)

In the middle part of FIG. 9, the preamble is expanded to show that it includes a plurality of symbols "S". A symbol in the PREAMBLE is repeated N times (e.g., N=64). Each symbol contains a code sequence of length L (e.g., L=127). A code sequence Z may be binary (+1/−1 sequence) or ternary (+1/0/−1 sequence), where:
  +1 means a pulse pointing "upwards"
  0 means no pulse
  −1 means a pulse pointing "downwards"

In between the pulses, there may be additional 0's (i.e., no pulse).

In the ranging mode, that is for UWB ranging signalling, the full frame is used. In the radar mode, that is for UWB radar signalling, only the PREAMBLE is used. The number of repeated symbols may be larger in the radar mode than it is for the ranging mode (e.g., 512 in radar vs. 64 in ranging).

Returning to FIG. 8, at step 829 the method estimates, and compensates for, one or more frequency and/or timing offsets. This can be especially well-suited to UWB ranging signalling because UWB ranging signalling includes more appropriate information than UWB radar signalling.

For example, at step 829, the method can estimate a carrier frequency offset (CFO) by a phase/frequency tracking loop in the receiver digital baseband and can be compensated by retuning an RF PLL by a frequency amount corresponding to the determined CFO.

Similarly, at step 829, the method can determine a timing offset (such as a sampling timing offset) using a timing tracking loop that can be used to set the sampling time to sample an UWB pulse at a maximum.

Further still, at step 829, the method can determine a local oscillator phase offset using a phase tracking loop and can compensate for it by rotating the (complex-valued) CIR by a phase amount corresponding to the determined phase offset.

It will be appreciated that these are non-limiting examples of ways in which the method can process the UWB ranging signalling in order to estimate, and compensate for, one or more frequency or timing offsets.

At step 830, the method wirelessly receives UWB radar signalling. In this example, the UWB radar signalling is processed after the UWB ranging signalling is processed at step 829 in order to estimate, and compensate for, one or more frequency or timing offsets. This reception of UWB radar signalling corresponds to the reception of UWB signalling at step 415 of FIG. 4.

Then at step 831, the method synchronizes the radar operation of the UWB receiver module based on timing information. This is a short-hand expression of the determination of a CIR, identification of a predetermined feature in the CIR and an associated channel tap, and synchronization steps that are shown as separate steps 416-418 in FIG. 4. Therefore, FIG. 8 can be considered as an example method that includes the functionality of steps 828 and 829 in addition to the functionality of FIG. 4.

Optionally, the processing at step 831 can also involve synchronizing the UWB receiver module for reception of subsequent UWB radar signalling based on the frequency and/or timing offsets that were estimated at step 829. This is in addition to the synchronization of FIG. 4 that is based on the channel tap that is associated with the identified feature in the CIR.

In this way, the RX of one device wirelessly receives at least one UWB ranging signal (frame) transmitted from the TX of another device. In one example, the RX can then determine the time-of-arrival (ToA) corresponding to the direct path and estimate and compensate one or more frequency and/or timing offsets. Since the offsets are compensated, the RX can switch to radar operation and receive one or more radar signals from the TX. Therefore, the RX radar operation has been synchronized to the TX based on timing information. For example, the TX may have sent timing information (via the payload) to the RX during the initial ranging signalling such that the radar operation can start after the ranging operation.

Variations to the processing that is described with reference to some of the above examples include:

The SYNC can be performed:
on a different frequency. For example, the UWB signalling that is used to determine the channel impulse response in which a feature is identified can have a different frequency to that of the subsequent UWB signalling. For example, because coupling can be frequency dependent, it can be better to perform the initial processing on a frequency that is lower than that of the subsequent UWB signalling such that it has good isolation. For example, the initial UWB signalling can be in Channel 9 at 8 GHz, whereas the subsequent UWB signalling can be in Channel 5 at 6.5 GHz.
with a different frame configuration (pulse shape, code, pulse repetition frequency etc.). For example, different pulses can be used for the UWB signalling that is used to determine the channel impulse response in which a feature is identified (e.g., Frame 1 in FIG. 7) when compared with those of the subsequent UWB signalling (e.g., Frames 2 and 3 in FIG. 7). In this way, pulses can initially be used that are better suited for identification of the feature—e.g., narrow pulses or pulses that have binary values (whereas the pulses of the subsequent UWB signalling have ternary values).
on a different (directional) antenna. For example, the UWB transmitter module and/or the UWB receiver module can include a dedicated antenna that transmits/receives the (initial) UWB signalling but does not transmit/receive the subsequent UWB signalling.

For the example of FIG. 8, which involves the use of independent clocks, the UWB ranging signalling may be sent:
only once initially before sending radar frames;
before each useful radar frame; or
after a certain number of radar frames.

This can be beneficial because the CFO is unlikely to be static, and therefore repeating the estimation, and compensation for, frequency or timing offsets can advantageously be performed periodically or when required.

For the example of FIG. 8, which involves the use of independent clocks, the UWB ranging signalling may be sent by an initiator (e.g., a key fob) that does not necessarily contain the UWB transmitter module that will be used for the radar operation. In addition, the UWB transmitter module that is used for transmitting UWB radar signalling radar may also include the functionality of a UWB receiver module that is synchronized with the initiator.

In general, any device of the multi-device radar systems disclosed herein may be a radar/ranging-capable device.

Examples described herein provide wireless synchronization between TX and RX in a multi-device radar system, comprising:
Wirelessly receiving a UWB radar signal on a direct path;
Determining a CIR from the received signal;
Detecting one or more features in the CIR;
Synchronizing the RX radar operation based on the CIR features; and optionally:
Wirelessly receiving a UWB ranging signal on a direct path;
Estimating and compensating timing and/or frequency offsets based on the received signal; and
Synchronizing the RX radar operation based on timing information.

The use of wireless synchronization for a multi-device UWB radar system described herein provides advantages over the use of wired synchronization. Synchronization can be performed in radar mode based on the direct path detected in a CIR, and optionally also using a ranging mode prior to the radar mode, in order to support both shared-clock and independent-clocks use cases.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein, and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data-based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An ultra-wideband, UWB, receiver module comprising:
an antenna for wirelessly receiving UWB signalling from a UWB transmitter module; and
a processor configured to:
determine a channel impulse response, CIR, of the wirelessly received UWB signalling, wherein the CIR comprises a plurality of channel taps each having a tap-response-value;
identify a predetermined feature in the CIR and an associated channel tap; and
based on the channel tap that is associated with the identified feature in the CIR, synchronize the UWB receiver module for reception of subsequent UWB signalling: wherein:
the plurality of channel taps of the CIR together represents a transmission symbol of the UWB transmitter module; and
the processor is configured to synchronize the UWB receiver module for reception of subsequent UWB signalling by:
determining a channel impulse response, CIR, of the received subsequent UWB signalling, wherein:
the CIR comprises a set of channel taps based on the channel tap that is associated with the identified feature in the CIR, and wherein the set of channel taps is a subset of the plurality of channel taps that together represent the transmission symbol of the UWB transmitter module; and
each of the set of channel taps has a tap-response-value; and
processing the tap-response-values of the CIR of the received subsequent UWB signalling to identify any reflected versions of the subsequent UWB signalling.

2. The UWB receiver module of claim 1, wherein the UWB signalling comprises UWB radar signalling.

3. The UWB receiver module of claim 1, wherein the processor is configured to identify a predetermined feature in the CIR that corresponds to reception of the UWB signalling via a direct path from the UWB transmitter module.

4. A multi-device radar system comprising:
the UWB receiver module of claim 1; and
a UWB transmitter module that is configured to wirelessly transmit UWB signalling to the UWB receiver module.

5. The multi-device radar system of claim 4, wherein the UWB receiver module and the UWB transmitter module have a shared or a common clock.

6. An ultra-wideband, UWB, receiver module comprising:
an antenna for wirelessly receiving UWB signalling from a UWB transmitter module; and
a processor configured to:
determine a channel impulse response, CIR, of the wirelessly received UWB signalling, wherein the CIR comprises a plurality of channel taps each having a tap-response-value;
identify a predetermined feature in the CIR and an associated channel tap; and
based on the channel tap that is associated with the identified feature in the CIR, synchronize the UWB receiver module for reception of subsequent UWB signalling;
wherein the processor is configured to identify the following predetermined feature in the CIR:

the channel tap of the CIR that has the highest tap-response-value.

7. The UWB receiver module of claim 6, wherein:
the plurality of channel taps of the CIR together represents a transmission symbol of the UWB transmitter module; and
the processor is configured to synchronize the UWB receiver module for reception of subsequent UWB signalling by:
determining a channel impulse response, CIR, of the received subsequent UWB signalling, wherein:
the CIR comprises a set of channel taps based on the channel tap that is associated with the identified feature in the CIR, and wherein the set of channel taps is a subset of the plurality of channel taps that together represent the transmission symbol of the UWB transmitter module; and
each of the set of channel taps has a tap-response-value; and
processing the tap-response-values of the CIR of the received subsequent UWB signalling to identify any reflected versions of the subsequent UWB signalling.

8. The UWB receiver module of claim 6, wherein the processor is configured to identify one or more of the following predetermined features in the CIR:
the first channel tap in the CIR that has a tap-response-value that is above a predetermined threshold;
the result of a mathematical function applied to the tap-response-values satisfying one or more predetermined function-criteria; and
a predetermined pulse shape defined by the tap-response-values of a plurality of channel taps.

9. The UWB receiver module of claim 6, wherein:
the UWB signalling comprises an initial UWB radar signalling frame; and
the subsequent UWB signalling comprises one or more subsequent UWB radar signalling frames.

10. The UWB receiver module of claim 6, wherein the channel tap that is associated with the predetermined feature in the CIR comprises:
the channel tap that exhibits the identified feature; or
a channel tap that has a predetermined relationship with the channel tap that exhibits the identified feature.

11. A multi-device radar system comprising:
the UWB receiver module of claim 6; and
a UWB transmitter module that is configured to wirelessly transmit UWB signalling to the UWB receiver module.

12. The multi-device radar system of claim 11, wherein the UWB receiver module and the UWB transmitter module have a shared or a common clock.

13. An ultra-wideband, UWB, receiver module comprising:
an antenna for wirelessly receiving UWB signalling from a UWB transmitter module; and
a processor configured to:
determine a channel impulse response, CIR, of the wirelessly received UWB signalling, wherein the CIR comprises a plurality of channel taps each having a tap-response-value;
identify a predetermined feature in the CIR and an associated channel tap; and
based on the channel tap that is associated with the identified feature in the CIR, synchronize the UWB receiver module for reception of subsequent UWB signalling;

wherein the processor is configured to identify one or more of the following predetermined features in the CIR:
the first channel tap in the CIR that has a tap-response-value that is above a predetermined threshold;
the result of a mathematical function applied to the tap-response-values satisfying one or more predetermined function-criteria; and
a predetermined pulse shape defined by the tap-response-values of a plurality of channel taps.

14. The UWB receiver module of claim 13, wherein:
the plurality of channel taps of the CIR together represents a transmission symbol of the UWB transmitter module; and
the processor is configured to synchronize the UWB receiver module for reception of subsequent UWB signalling by:
determining a channel impulse response, CIR, of the received subsequent UWB signalling, wherein:
the CIR comprises a set of channel taps based on the channel tap that is associated with the identified feature in the CIR, and wherein the set of channel taps is a subset of the plurality of channel taps that together represent the transmission symbol of the UWB transmitter module; and
each of the set of channel taps has a tap-response-value; and
processing the tap-response-values of the CIR of the received subsequent UWB signalling to identify any reflected versions of the subsequent UWB signalling.

15. The UWB receiver module of claim 13, wherein:
the UWB signalling comprises an initial UWB radar signalling frame; and
the subsequent UWB signalling comprises one or more subsequent UWB radar signalling frames.

16. The UWB receiver module of claim 13, wherein the channel tap that is associated with the predetermined feature in the CIR comprises:
the channel tap that exhibits the identified feature; or
a channel tap that has a predetermined relationship with the channel tap that exhibits the identified feature.

17. A multi-device radar system comprising:
the UWB receiver module of claim 5; and
a UWB transmitter module that is configured to wirelessly transmit UWB signalling to the UWB receiver module.

18. The multi-device radar system of claim 17, wherein the UWB receiver module and the UWB transmitter module have a shared or a common clock.

19. An ultra-wideband, UWB, receiver module comprising:
an antenna for wirelessly receiving UWB signalling from a UWB transmitter module; and
a processor configured to:
determine a channel impulse response, CIR, of the wirelessly received UWB signalling, wherein the CIR comprises a plurality of channel taps each having a tap-response-value;
identify a predetermined feature in the CIR and an associated channel tap; and
based on the channel tap that is associated with the identified feature in the CIR, synchronize the UWB receiver module for reception of subsequent UWB signalling;
wherein:
the UWB signalling comprises an initial UWB radar signalling frame; and the subsequent UWB signalling comprises one or more subsequent UWB radar signalling frames.

20. The UWB receiver module of claim 19, wherein:
the plurality of channel taps of the CIR together represents a transmission symbol of the UWB transmitter module; and
the processor is configured to synchronize the UWB receiver module for reception of subsequent UWB signalling by:
  determining a channel impulse response, CIR, of the received subsequent UWB signalling, wherein:
    the CIR comprises a set of channel taps based on the channel tap that is associated with the identified feature in the CIR, and wherein the set of channel taps is a subset of the plurality of channel taps that together represent the transmission symbol of the UWB transmitter module; and
    each of the set of channel taps has a tap-response-value; and
  processing the tap-response-values of the CIR of the received subsequent UWB signalling to identify any reflected versions of the subsequent UWB signalling.

21. The UWB receiver module of claim 19, wherein the channel tap that is associated with the predetermined feature in the CIR comprises:
the channel tap that exhibits the identified feature; or
a channel tap that has a predetermined relationship with the channel tap that exhibits the identified feature.

22. A multi-device radar system comprising:
the UWB receiver module of claim 19; and
a UWB transmitter module that is configured to wirelessly transmit UWB signalling to the UWB receiver module.

23. The multi-device radar system of claim 22, wherein the UWB receiver module and the UWB transmitter module have a shared or a common clock.

24. An ultra-wideband, UWB, receiver module comprising:
an antenna for wirelessly receiving UWB signalling from a UWB transmitter module; and
a processor configured to:
  determine a channel impulse response, CIR, of the wirelessly received UWB signalling, wherein the CIR comprises a plurality of channel taps each having a tap-response-value;
  identify a predetermined feature in the CIR and an associated channel tap; and
  based on the channel tap that is associated with the identified feature in the CIR, synchronize the UWB receiver module for reception of subsequent UWB signalling;
wherein the channel tap that is associated with the predetermined feature in the CIR comprises:
the channel tap that exhibits the identified feature; or
a channel tap that has a predetermined relationship with the channel tap that exhibits the identified feature.

25. The UWB receiver module of claim 24, wherein:
the plurality of channel taps of the CIR together represents a transmission symbol of the UWB transmitter module; and
the processor is configured to synchronize the UWB receiver module for reception of subsequent UWB signalling by:
  determining a channel impulse response, CIR, of the received subsequent UWB signalling, wherein:
    the CIR comprises a set of channel taps based on the channel tap that is associated with the identified feature in the CIR, and wherein the set of channel taps is a subset of the plurality of channel taps that together represent the transmission symbol of the UWB transmitter module; and
    each of the set of channel taps has a tap-response-value; and
  processing the tap-response-values of the CIR of the received subsequent UWB signalling to identify any reflected versions of the subsequent UWB signalling.

26. A multi-device radar system comprising:
the UWB receiver module of claim 8; and
a UWB transmitter module that is configured to wirelessly transmit UWB signalling to the UWB receiver module.

27. The multi-device radar system of claim 26, wherein the UWB receiver module and the UWB transmitter module have a shared or a common clock.

28. An ultra-wideband, UWB, receiver module comprising:
an antenna for wirelessly receiving UWB signalling from a UWB transmitter module; and
a processor configured to:
  determine a channel impulse response, CIR, of the wirelessly received UWB signalling, wherein the CIR comprises a plurality of channel taps each having a tap-response-value;
  identify a predetermined feature in the CIR and an associated channel tap; and
  based on the channel tap that is associated with the identified feature in the CIR, synchronize the UWB receiver module for reception of subsequent UWB signalling;
wherein the UWB signalling comprises UWB ranging signalling and UWB radar signalling, and
the processor is configured to:
  process the UWB ranging signalling in order to estimate, and compensate for, one or more frequency or timing offsets;
  determine the channel impulse response, CIR, of the UWB radar signalling, wherein the CIR comprises a plurality of channel taps each having a tap-response-value;
  identify a predetermined feature in the CIR and an associated channel tap; and
  based on the channel tap that is associated with the identified feature in the CIR synchronize the UWB receiver module for reception of subsequent UWB radar signalling.

29. The UWB receiver module of claim 28, wherein the processor is configured to:
synchronize the UWB receiver module for reception of subsequent UWB radar signalling based on: the channel tap that is associated with the identified feature in the CIR; and the estimated frequency or timing offsets.

30. The UWB receiver module of claim 28, wherein the processor is configured to process the UWB ranging signalling in order to estimate, and compensate for, carrier frequency offset.

31. The UWB receiver module of claim 28, wherein the processor is configured to process the UWB ranging signalling in order to estimate, and compensate for, one or both of:
a timing offset; and
a local oscillator phase offset.

32. The UWB receiver module of claim 28, wherein the processor is configured to identify one or more of the following predetermined features in the CIR:
the first channel tap in the CIR that has a tap-response-value that is above a predetermined threshold;

the result of a mathematical function applied to the tap-response-values satisfying one or more predetermined function-criteria; and
a predetermined pulse shape defined by the tap-response-values of a plurality of channel taps.

33. The UWB receiver module of claim 28, wherein:
the plurality of channel taps of the CIR together represents a transmission symbol of the UWB transmitter module; and
the processor is configured to synchronize the UWB receiver module for reception of subsequent UWB signalling by:
  determining a channel impulse response, CIR, of the received subsequent UWB signalling, wherein:
    the CIR comprises a set of channel taps based on the channel tap that is associated with the identified feature in the CIR, and wherein the set of channel taps is a subset of the plurality of channel taps that together represent the transmission symbol of the UWB transmitter module; and
    each of the set of channel taps has a tap-response-value; and
  processing the tap-response-values of the CIR of the received subsequent UWB signalling to identify any reflected versions of the subsequent UWB signalling.

34. The UWB receiver module of claim 28, wherein:
the UWB signalling comprises an initial UWB radar signalling frame; and
the subsequent UWB signalling comprises one or more subsequent UWB radar signalling frames.

35. The UWB receiver module of claim 28, wherein the channel tap that is associated with the predetermined feature in the CIR comprises:
the channel tap that exhibits the identified feature; or
a channel tap that has a predetermined relationship with the channel tap that exhibits the identified feature.

36. The UWB receiver module of claim 28, wherein the processor is configured to identify the following predetermined feature in the CIR:
the channel tap of the CIR that has the highest tap-response-value.

37. A multi-device radar system comprising:
the UWB receiver module of claim 28; and
a UWB transmitter module that is configured to wirelessly transmit UWB signalling to the UWB receiver module.

38. The multi-device radar system of claim 37, wherein the UWB receiver module and the UWB transmitter module have a shared or a common clock.

39. A method of synchronizing an ultra-wideband, UWB, receiver module, the method comprising:
wirelessly receiving UWB signalling from a UWB transmitter module; and
determining a channel impulse response, CIR, of the wirelessly received UWB signalling, wherein the CIR comprises a plurality of channel taps each having a tap-response-value;
identifying a predetermined feature in the CIR and an associated channel tap; and
based on the channel tap that is associated with the identified feature in the CIR, synchronizing the UWB receiver module for reception of subsequent UWB signalling;
wherein the channel tap that is associated with the predetermined feature in the CIR comprises:
  the channel tap that exhibits the identified feature; or
  a channel tap that has a predetermined relationship with the channel tap that exhibits the identified feature.

40. The method of claim 39, wherein:
the plurality of channel taps of the CIR together represents a transmission symbol of the UWB transmitter module; and
the synchronizing the UWB receiver module for reception of subsequent UWB signalling includes:
  determining a channel impulse response, CIR, of the received subsequent UWB signalling, wherein:
    the CIR comprises a set of channel taps based on the channel tap that is associated with the identified feature in the CIR, and wherein the set of channel taps is a subset of the plurality of channel taps that together represent the transmission symbol of the UWB transmitter module; and
    each of the set of channel taps has a tap-response-value; and
  processing the tap-response-values of the CIR of the received subsequent UWB signalling to identify any reflected versions of the subsequent UWB signalling.

41. The method of claim 39, wherein:
the UWB signalling comprises an initial UWB radar signalling frame; and
the subsequent UWB signalling comprises one or more subsequent UWB radar signalling frames.

42. The method of claim 39, wherein the identifying the predetermined feature includes identifying the channel tap of the CIR that has the highest tap-response-value.

* * * * *